United States Patent [19]

Williams

[11] 3,750,687

[45] Aug. 7, 1973

[54] METHOD AND SYSTEM FOR TRANSPORTING DIFFERENT TYPES OF FLUID IN A PIPELINE

[75] Inventor: Jack C. Williams, Houston, Tex.

[73] Assignee: Texaco Inc., New York, N.Y.

[22] Filed: Apr. 28, 1972

[21] Appl. No.: 248,411

[52] U.S. Cl.................... 137/1, 137/111, 137/154, 137/567, 137/597, 137/606
[51] Int. Cl............................................. F16k 19/00
[58] Field of Search ................... 137/1, 2, 10, 111, 137/154, 172, 567, 597, 606; 166/52

[56] References Cited
UNITED STATES PATENTS
2,706,254  4/1955  Mithoff et al................... 137/154 X
3,654,959  4/1972  Kassel............................ 137/154 X

*Primary Examiner*—Robert G. Nilson
*Attorney*—Thomas H. Whaley et al.

[57] ABSTRACT

A method comprises (a) monitoring the exact rate of flow of a liquid through a pipeline and (b) injecting slugs of a like type of liquid from different tanks of a like type into the pipeline at the precise rate and time dictated by the pipeline flow rate to form a large slug of liquid in the pipeline for transporting to a distant location.

The second step may include injecting slugs of like type of liquid different from the first type into the pipeline to form a large slug of the different type of liquid immediately behind the first large slug for transporting to the distant location. Likewise, the second step may include forming large slugs of different types of liquids in accordance to the timing and flow rate dictated from the first step for forming one consecutive large slug of like liquids of one type after another consecutive large slug of like liquids of another type in the pipeline for transporting to the distant location. An apparatus for practicing the method comprises a combination of valves and pumps for each tank and a computer responsive to the rate of liquid flow in the pipeline and distance to travel to the next tank for providing the arrival time.

16 Claims, 1 Drawing Figure

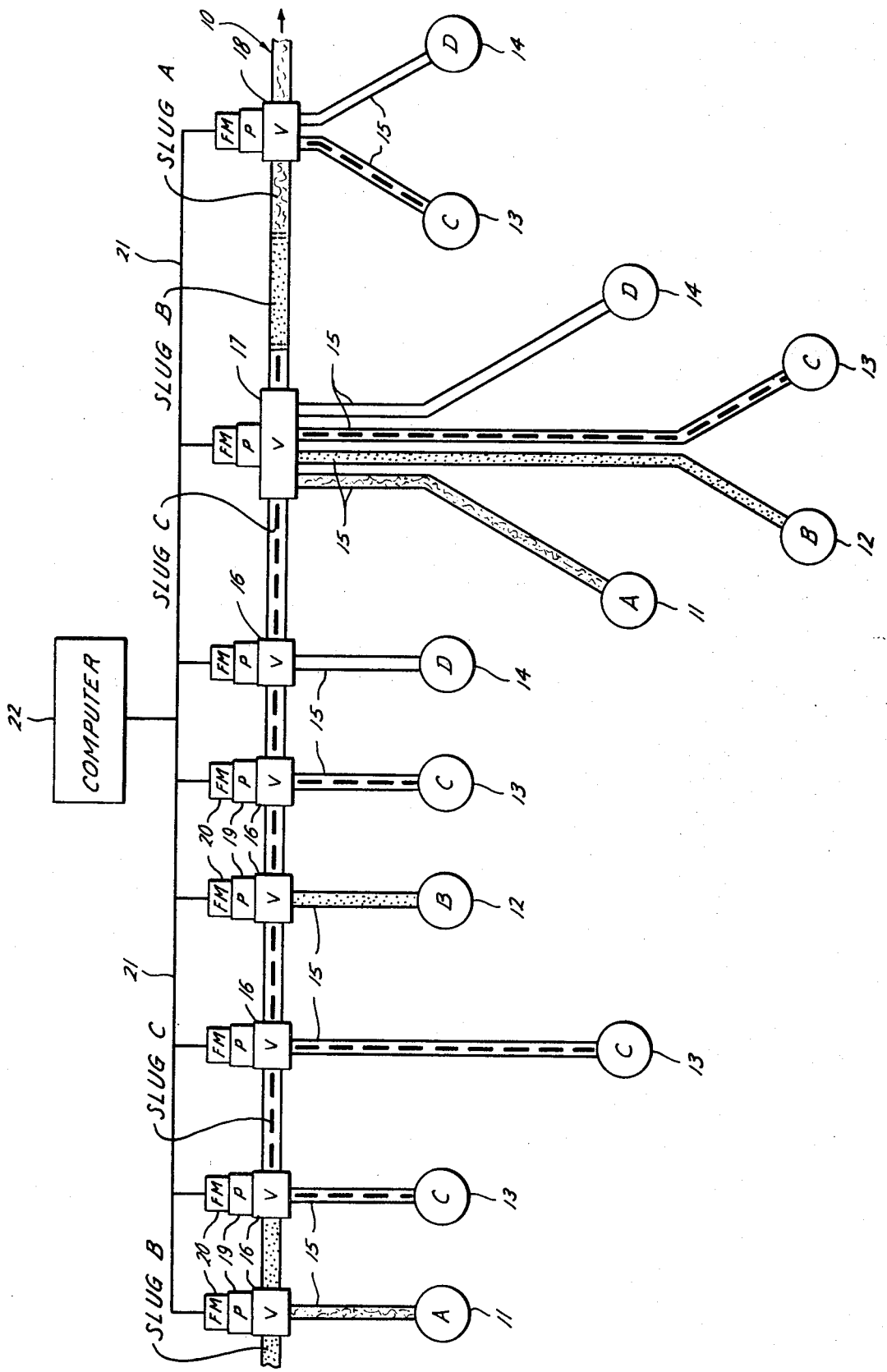

3,750,687

METHOD AND SYSTEM FOR TRANSPORTING DIFFERENT TYPES OF FLUID IN A PIPELINE

BACKGROUND OF THE INVENTION

While computer production control of oil and gas wells have enjoyed approximately ten years of experience as evidenced in the Oil and Gas Journal, Mar. 6, 1972, pages 107–133, no radical improvements in oil and gas movements have occurred prior to the disclosed method and system for transporting different types of fluids in a pipeline, as oil and gas.

While slugs of different liquids have been transported through pipes with a liquid impervious divider therebetween, as suggested by U. S. Pat. No. 1,966,819, no disclosure is known of a method or apparatus for monitoring the exact location of each slug of different liquids by dividing the distance by the rate of flow to provide the time of arrival of the slug, and adding more liquid of the same type to a like slug.

OBJECTS OF THE INVENTION

Accordingly, a primary object of this invention is to provide a method for accumulating and transporting large amounts of different types of fluids economically and efficiently, as through a single pipeline.

Another primary object of this invention is to provide at least one mechanism for practicing the method disclosed for accumulating and transporting fluids of different types through a single pipeline.

A further object of this invention is to provide a system for accumulating and transporting a plurality of different types of fluids through a single pipeline automatically and with unattended operation on a continuous basis.

Likewise another object of this invention is to eliminate large central surge tankage at pipeline pumping stations by improved planning, oil distribution, and flow control.

A still further object of this invention is to provide a method and at least one mechanism for practicing the method for accumulating and transporting different types of a fluid in a single pipeline which results in greater efficiency and utilization of the pipeline.

Another object of this invention is to provide a system for accumulating and transporting different types of fluid in a pipeline which is easy to operate, is of simple configuration, is economical to build and assemble, and is of greater efficiency.

Other objects and various advantages of the disclosed method and system for transporting different types of fluid in a pipeline will be apparent from the following detailed description, together with accompanying drawing, submitted for purposes of illustration only and not intended to define the scope of the invention, reference being had for that purpose to the subjoined claims.

BRIEF DESCRIPTION OF THE DRAWING

The drawing diagrammatically illustrates by way of example, not by way of limitation, one system or mechanism for carrying out the method of the invention.

The FIGURE is a schematic plan view of the new system as applied to a pipeline.

DESCRIPTION OF THE INVENTION

The invention disclosed herein, the scope of which being defined in the appended claims, is not limited in its application to the details of construction and arrangement of parts shown and described for carrying out the disclosed method, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinafter set forth will occur to those skilled in the art. Therefore, all such modifications and variations which are within the spirit and scope of the invention herein are included and only such limitations should be imposed as are indicated in the appended claims.

DESCRIPTION OF THE METHOD

This invention comprises at least one method with varied steps for transporting different types of fluid in a pipeline.

For purposes of illustration and while gases also may be transported, the example of fluid described in detail is a liquid and the liquid is crude oil. Further while the crude oil may be divided in various ways, it is illustrated as being divided by specific gravity or grades of crude oil from a plurality of sources as oil wells or oil storage tanks. This oil is transported from a gathering line to a main line directly to a larger storage tank or to an oil refinery.

The method for transporting different types or grades of crude oil in a gathering pipeline from a plurality of tanks to a distant location comprises the steps of, 1. injecting a slug as a tank full of the desired grade of crude oil to be transported from one tank into the gathering pipeline,
2. monitoring the exact rate of flow of the crude oil through the gathering pipeline, and
3. injecting succeeding slugs of the same type of oil from successive tanks into the gathering pipeline according to the monitored flow rate in the pipeline to join each other to form a large slug of the desired type of crude oil in the gathering pipeline for transporting to the main pipeline and on to the desired refinery.

For greater efficiency, the third step may be expanded by 3. injecting slugs of like grade of oil different from the first grade into the pipeline to form a large slug of the different grade of oil immediately behind or contiguous with the first slug for transporting to the distant refinery.

For increased efficiency, the third step is expanded further by, 3. injecting slugs of different grades of oil in accordance to the timing and flow rate dictated from the monitoring of the gathering pipeline flow rate for forming one consecutive large slug of like oil of one type after another consecutive large slug of like oil of another type in the gathering pipeline for transporting one type of oil after another to the same or different refineries at a distant location on the main pipeline.

DESCRIPTION OF THE SYSTEM

An apparatus or system of elements for practicing or carrying out the above disclosed method of segregating oils and transporting them to various refineries or large storage tanks is schematically illustrated on the drawing.

A gathering pipeline 10 is illustrated for carrying crude oil, for example, from left to right. Different groups of conventional tanks or wells 11, 12, 13, and 14 are illustrated as containing the four exemplary grades of crude oil, A, B, C, and D, respectively.

Tie lines 15 connect all tanks to the gathering pipeline 10 through valves 16, 17, and 18, depending on the number of tie lines at each valve, i.e., valve 16 connects all single tie lines 15 to the gathering pipeline 10, valve 17 connects the four tie lines 15, 15, 15, 15 to the gathering pipeline, and valve 18 connects two tie lines 15, 15 to the gathering pipeline. While valve 17 is preferably a group of four valves, it is shown as a four ported valve. Likewise, while it is preferred that valve 18 be a plurality or two valves, it is illustrated as a single two port valve. In most cases here, a plurality of valves is preferred over multiport valves. A suitable conventional pump as hydraulic pump 19 is connected to each valve so that each valve and pump pair operates to allow no oil to enter the gathering pipeline at that point but pump the oil on downstream, or they stop the flow upstream and pump only oil from the attached tank into the gathering pipeline, or they pump a proportion of each oil into the gathering pipeline to continue on downstream, depending on the desired operation of the pump and valves.

Further, conventional flow sensing meters 20 are attached to the gathering pipeline at intervals, such as at each inlet or connection of each tank tie line to the gathering pipeline for monitoring either the exact rate in digital form of crude oil flow in the gathering pipeline or the actual grade of the crude oil itself.

Circuitry 21 connects each of the valves 16 – 18, pumps 19, and flow meters 20 to a suitable conventional computer 22, such as but not limited to, a Hewlett Packard 2116B minicomputer as disclosed on page 122 of the above identified Journal, for control of the pumps and valves responsive to the monitoring of the grade of the oil or the exact flow rate of the oil in the gathering pipeline. The distance to travel to a predetermined location in the main line divided by the flow velocity of the oil provides the time of arrival of the oil at the predetermined location.

From information as the oil flow rates at different points in the gathering pipeline, the pipe diameter at different points, if different, and any appropriate variables fed into the computer, the computer may calculate the distance the slug has moved, the amount it has grown from each input from each tank, and thus open valves at the proper time to form the next large slug of a different grade of oil in the gathering pipeline.

OPERATION

This system utilizes timed injection of crude oil from various source points into a gathering system network to accomplish crude oil segregation and eliminate large central tankage at pipeline pumping stations.

Basically, this apparatus gathers together little slugs of crude oil of a like grade from different tanks or wells into the gathering pipeline to form a large slug of a particular grade, continually monitoring its progress through the gathering pipeline as it is pumped to a main pipeline and on to the refinery or large storage tank. Immediately behind the first large slug, a second large slug of a different grade of oil, similarly is formed for transporting to a distant location. Additional different large slugs are formed continually thereafter and transported to their destinations in one continuous flow with maximum speed and efficiency.

In greater detail, as the first small slug begins to enter and move down the gathering pipeline, the distance to the next tank of like grade is programmed in the computer and is divided by the rate of flow which is sensed initially to provide the instant of time when to actuate the next valve to feed in the next small slug for forming the large slug. Each new small slug may be added in front of the prior small slug, or blended in at a predetermined and monitored proportion or added at the end of the first slug, as desired, just so that both ends of each are always monitored. Then as each small slug is added and its valve cut off between the tank tie line and the gathering pipeline, the large slug is formed, the location of both ends of the large slug being continuously monitored. Actual grade of crude oil detecting monitors may be utilized to detect the interface between the different grades of crude oil and this information fed to the computer to upgrade its positional computation of the particular slugs monitored, if so desired and required.

Also, under computer control, the total of oil needed of a particular grade from a group of wells can be remotely set to form a large slug from small slugs of the like grade of oil and the computer can then adjust the load among the wells according to the desired programmed plan.

Accordingly, it will be seen that the disclosed method and system for transporting different fluids through a pipeline operate in a manner which meets each of the objects set forth hereinbefore by forming large slugs of fluid from small slugs of like fluid and forming one large different slug after another with accurate and precise monitoring.

While at least one method of the invention and a mechanism for carrying out the method has been disclosed, it will be evident that various other methods and modifications are possible in the arrangement and construction of the disclosed method and fluid transporting system for carrying out or practicing the method without departing from the scope of the invention and it is accordingly desired to comprehend within the purview of this invention such modifications as may be considered to fall within the scope of the appended claims.

I claim:

1. A method for transporting a plurality of different types of liquids in a pipeline from a plurality of tanks to a distant location comprising the steps of,
   a. injecting a slug of one type of liquid from one tank into the pipeline,
   b. monitoring the exact rate of flow of the liquid through the pipeline, and
   c. injecting succeeding slugs of the same type of liquid from successive tanks into the pipeline according to the monitored flow rate in the pipeline to join each other to form a large slug of the one type of liquid in the pipeline for transporting to the distant location.

2. A method for transporting a plurality of different types of fluids in a pipeline from a plurality of tanks to a distant location comprising the steps of,
   a. monitoring the exact rate of flow of a fluid through the pipeline,
   b. injecting slugs of a like type of fluid from different tanks of a like type into the pipeline at the precise rate and time dictated by the pipeline flow rate to form a large slug of like fluid in the pipeline for transporting to the distant location.

3. A method as recited in claim 2 wherein the second step includes also,
   a. injecting slugs of like type of fluid different from the first type into the pipeline to form a large slug of the different type of fluid immediately behind the first slug for transporting to the distant location.

4. A method as recited in claim 2 wherein the second step also includes,
   a. injecting slugs of like type of fluid different from the first type into the pipeline to form a large slug of the different type of fluid contiguous with the first slug for transporting to the distant location.

5. A method as recited in claim 2 wherein the second step includes also,
   a. injecting slugs of different types of liquids in accordance to the timing and flow rate dictated from the monitoring of the pipeline flow rate for forming one consecutive large slug of like liquids of one type after another consecutive large slug of like liquids of another type in the pipeline for transporting to the distant location.

6. A system for gathering and transporting large slugs of different types of liquid in a pipeline from a plurality of tanks of different types of liquid to a distant location comprising,
   a. a valve and pump connected between each of said tanks and said pipeline for passing a slug of liquid from each tank into said pipeline at a precise time and rate as controlled,
   b. computer means responsive to the rate of liquid flow in said pipeline, and
   c. said computer means is connected to each of said valves and pumps for controlling the flow of all slugs of like liquids into said pipeline for forming a first large slug of like liquid in said pipeline for transporting to said distant location.

7. A pipeline system as recited in claim 6 wherein,
   a. said computer means is connected to each of said valves and pumps for controlling the flow of all slugs of a second type of liquid into said pipeline for forming a second large slug of like liquid in said pipeline immediately behind said first slug for transporting to a distant location.

8. A pipeline system as recited in claim 6 wherein,
   a. each of said valves and pumps is connected to said computer means for forming one consecutive large slug of a different type of liquid after another large slug in said pipeline for transporting to said distant location.

9. A pipeline system as recited in claim 6 wherein,
   a. said computer means is connected to said valves and pumps for controlling the flow of all slugs of all different types of liquids for forming one consecutive large slug of like liquids of one type after another consecutive large slug of like liquids of another type in said pipeline for transporting to said distant location.

10. A system for gathering and transporting large slugs of different types of liquid in a pipeline from a plurality of tanks of a plurality of different types of liquid to a distant location comprising,
    a. valve and pump means for each of said plurality of tanks for controlling the flow of a slug of liquid from each tank into the pipeline at a precise time and rate as controlled,
    b. computing means responsive to the rate of flow in said pipeline, and
    c. said valve and pump means being responsive to said computing means for joining together slugs of the same type of liquid from different tanks of the same type of liquid to form a large slug in said pipeline for transporting to said distant location.

11. A pipeline system as recited in claim 10 wherein,
    a. said valve and pump means being responsive to said computing means for joining together slugs of a second type of liquid from different tanks of the second type of liquid to form a large slug of said second type in said pipeline in juxtaposition with said first slug for transporting to said distant location.

12. A pipeline system as recited in claim 10 wherein,
    a. said valve and pump means being responsive to said computing means for forming one consecutive large slug of a different type of liquid after another in said pipeline for transporting to said distant location.

13. A system for gathering and transporting large slugs of different types of fluid in a pipeline from a plurality of tanks of a plurality of different types of fluid to a distant location comprising,
    a. valve and pump means for each of said plurality of tanks for controlling the flow of a slug of fluid from each respective tank into the pipeline at a precise time and rate as controlled,
    b. computer means for activating said valve and pump means for causing a slug of each different type of fluid from each different tank to flow into said pipeline at a desired and precise rate, and
    c. said valve and pump means being responsive to said computing means for joining together slugs of a like type of fluid from different tanks of the like type of fluid to form a large slug in said pipeline for transporting to said distant location.

14. A system for gathering and transporting large slugs of different types of fluid in a pipeline from a plurality of tanks of a plurality of different types of fluid to a distant location comprising,
    a. valve and pump means for each of said plurality of tanks for controlling the flow of a slug of fluid from each tank into the pipeline at a precise time and rate as controlled,
    b. computing means responsive to the rate of flow in said pipeline, and
    c. said valve and pump means being responsive to said computing means for joining together slugs of a like fluid from different tanks of a like fluid to form a large slug of like fluid in said pipeline for transporting to said distant location.

15. A pipeline system as recited in claim 14 wherein,
    a. said valve and pump means being responsive to said computing means for joining together slugs of a second type of fluid from different tanks of said second type of fluid to form a large slug of said second type in said pipeline contiguous with said first slug for transporting to said distant location.

16. A pipeline system as recited in claim 14 wherein,
    a. said valve and pump means being responsive to said computing means for forming one consecutive large slug of a different type of fluid after another in said pipeline for transporting to said distant location.

* * * * *